United States Patent [19]

Aichelmann, Jr. et al.

[11] Patent Number: 4,604,751
[45] Date of Patent: Aug. 5, 1986

[54] ERROR LOGGING MEMORY SYSTEM FOR AVOIDING MISCORRECTION OF TRIPLE ERRORS

[75] Inventors: Frederick J. Aichelmann, Jr.; Philip M. Ryan, both of Hopewell Junction, N.Y.

[73] Assignee: International Business Machines Corporation, Armonk, N.Y.

[21] Appl. No.: 626,275

[22] Filed: Jun. 29, 1984

[51] Int. Cl.⁴ .................................... G06F 11/10
[52] U.S. Cl. ................................ 371/38; 371/21
[58] Field of Search .................. 371/38, 13, 18, 29, 371/21; 364/200, 900

[56] References Cited

U.S. PATENT DOCUMENTS

| | | | |
|---|---|---|---|
| 3,402,390 | 9/1968 | Tsimbidis et al. | 340/146.1 |
| 3,504,340 | 3/1970 | Allen | 340/146.1 |
| 3,601,798 | 8/1971 | Hsiao | 340/146.1 |
| 3,622,982 | 11/1971 | Clark, Jr. | 340/146.1 |
| 3,656,107 | 4/1972 | Hsiao et al. | 340/146.1 |
| 3,685,014 | 8/1972 | Hsiao et al. | 340/146.1 |
| 3,714,629 | 1/1973 | Hong et al. | 340/146.1 AL |
| 4,030,067 | 6/1977 | Howell et al. | 340/146.1 AL |
| 4,117,458 | 9/1978 | Burghard et al. | 340/146.1 AL |
| 4,139,148 | 2/1979 | Scheuneman | 371/38 |
| 4,163,147 | 7/1979 | Scheuneman | 371/38 |
| 4,174,537 | 11/1979 | Chu | 371/38 |
| 4,251,863 | 2/1981 | Rothenberger | 364/200 |
| 4,319,901 | 1/1982 | Harding et al. | 365/200 |
| 4,334,307 | 6/1982 | Bourgeois et al. | 371/16 |
| 4,371,930 | 2/1983 | Kim | 371/38 |
| 4,371,949 | 2/1983 | Chu | 371/38 |
| 4,375,664 | 3/1983 | Kim | 371/38 |
| 4,506,362 | 3/1985 | Morley | 371/38 |
| 4,535,455 | 8/1985 | Peterson | 371/38 |

OTHER PUBLICATIONS

IBM Technical Disclosure Bulletin, vol. 13, No. 8, Jan. 1971, p. 2190, "Multiple Error Correction" by B. E. Bachman et al.

IBM Technical Disclosure Bulletin, vol. 20, No. 9, Feb. 1978, pp. 3643-3645, by T. L. Crooks et al., "Main Storage Error Correction and Error Logging by Control Storage Routines".

Primary Examiner—Michael R. Fleming
Attorney, Agent, or Firm—Robert J. Haase

[57] ABSTRACT

Miscorrection of triple errors is avoided in a memory system equipped with a single bit error detection and correction/double bit error detection code by providing a double bit error logging technique. The address of each fetched word is logged in which a double bit error is detected. The address of each fetched word in which a single bit error is detected is compared with all logged addresses. If a coincidence is found between the compared addresses, a triple bit error alerting signal is generated and error recovery procedures are initiated.

8 Claims, 1 Drawing Figure

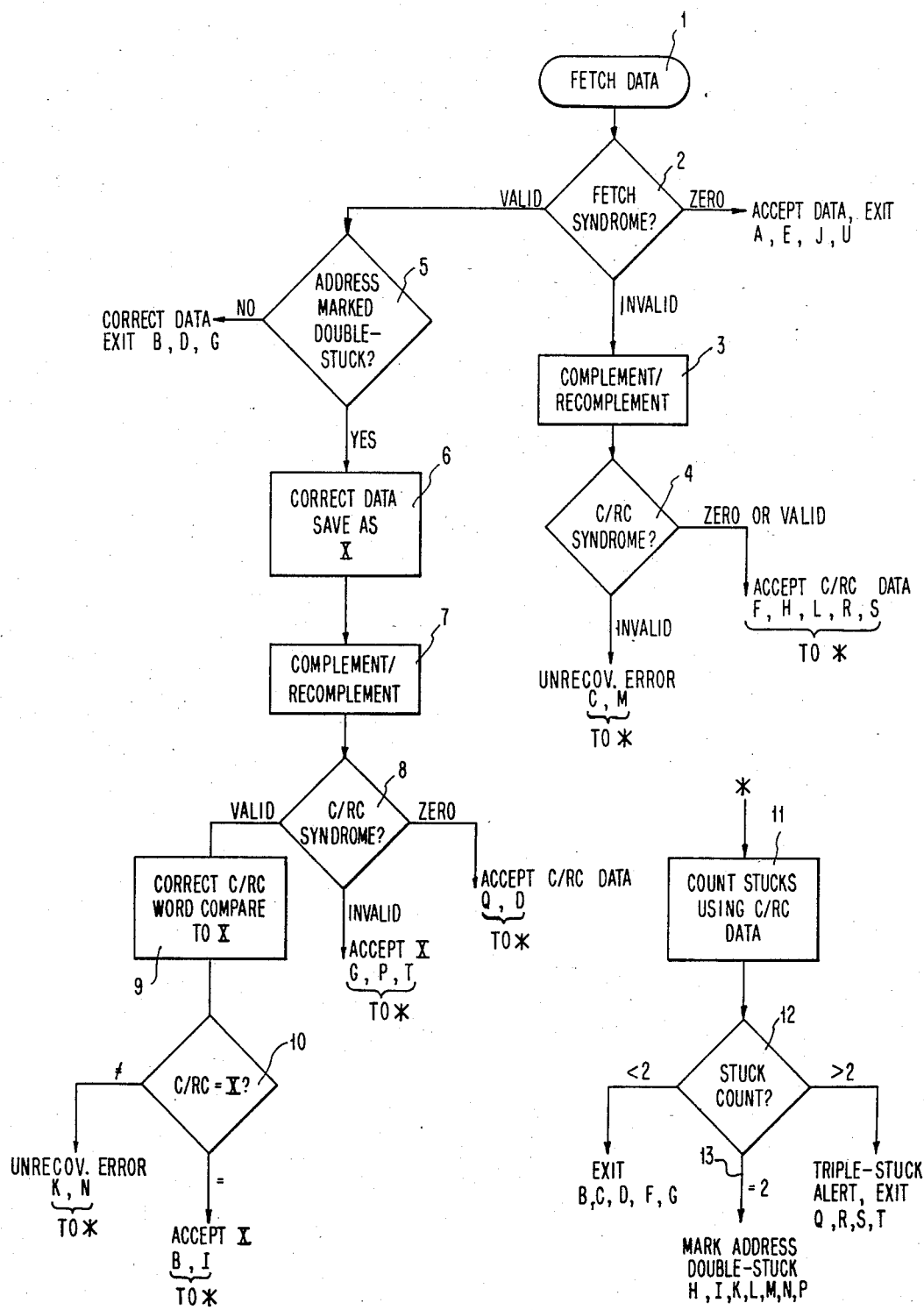

ERROR LOGGING MEMORY SYSTEM FOR AVOIDING MISCORRECTION OF TRIPLE ERRORS

BACKGROUND OF THE INVENTION

1. Field of the Invention

The present invention generally relates to the detection of erroneous data bits and, more particularly, to the extension of the error detection capability of a given code without extension of the number of coded bits required.

2. Description of the Prior Art

Special coding techniques are well known for the detection and correction of erroneous bits of data words read from computer memories. Depending upon the number of check bits and the complexity of the coding employed, multiple bit errors can be detected and corrected. As might be expected, the fewer the bits being examined and processed for detection and correction of errors, the simpler the required hardware/software to do the job.

Occasionally, it is possible to extend the capability of a given technique to detect and/or correct faulty data bits by the addition of relatively modest means to the existing structure. One such example is described in the IBM ® Technical Disclosure bulletin article by B. C. Bachman et al., entitled "Multiple Error Correction", Vol. 13, No. 8, January 1971, page 2190. In that instance, a log is maintained of known double errors in terms of the addresses of the words in which they occur. Each time that such words are addressed, the known faulty bits are simply inverted upon read out. The normal and more complex procedure of complement/recomplement to correct double faults is averted and system performance is enhanced. However, no extension of error detection capability is achieved.

The complement/recomplement procedure utilizes a single error correction-double error detection (SEC/DED) code such as described in U.S. Pat. No. 3,601,798 issued on Aug. 24, 1971 to Hsiao and assigned to the present assignee. When a double error is detected, the word fetched from memory is read into a register and the complement of the fetched word is rewritten back into the original memory location. A fetch cycle is then executed on the complement of the fetched word and the word and its complement are compared in an Exclusive OR circuit that identifies the location of the failing bits. This information is utilized to complement the incorrect bits in the original fetched word.

U.S. Pat. Nos. 3,656,107, issued on Apr. 11, 1972 to Hsiao et al., and 3,685,014, issued on Aug. 15, 1972 to Hsiao et al., both assigned to the present assignee, show methods for detecting and correcting double errors and for detecting triple errors (DEC/TED) but those methods utilize more check bits than do basic SEC/DEC schemes. The same is true of U.S. Pat. No. 3,714,629, issued on Jan. 30, 1973 to Hong et al., and assigned to the present assignee.

SUMMARY OF THE INVENTION

A double fault directory is established by noting the memory address each time that a double fault is encountered using a SEC/DED code and complement/recomplement logic. The error detection capability of the code is extended to triple faults (without extension of the number of code bits) by checking the directory each time that an apparent single error is detected by the SEC/DED code. If the apparent single error occurs at a noted double error location, a triple error is noted and additional logic is exercised to determine whether correction of the triple error can be achieved using complement/recomplement and error correction code (ECC) procedures.

BRIEF DESCRIPTION OF THE DRAWING

The sole FIGURE is a logic flow diagram of the triple error detection method of the present invention.

BEST MODE FOR CARRYING OUT THE INVENTION

Conventional error correcting code (ECC) logic corrects any fetched memory word containing a single incorrect bit and detects but does not correct any word containing two errors. This is particularly useful in those typical memory system configurations where no constituent chip provides more than one bit to any memory word. Thus, irrespective of the type of individual chip fail, e.g., individual cell failure, bit line or word line failure or entire chip kill, no more than one bit of any memory word is affected and it can be corrected by ECC.

Complement/recomplement techniques allow double errors due to the alignment of two faults, at least one of which is "stuck", (i.e., permanent fault rather than transient) to be corrected. Such incidents, even though correctable, require some action to be taken. In large systems, this action may involve deallocating portions of memory containing words in which such alignment has occurred and requesting repair at some convenient time. In small systems this action may involve shutting down the memory, and hence the system, until the faulty elements are replaced. Faults which align to produce double errors in one or more words cannot be tolerated. The appearance of a third fault may be erroneously interpreted as a single fault and, thus, lead to mis-corrected words and false data being injected into a user's files without any indication that a problem exists.

On the other hand, aligned double errors could be left unrepaired, maintenance cost reduced, and system availability increased, if the occurrence of a triple error were guaranteed to be detectable. The problem, again, is that SEC/DED codes have a substantial likelihood of mis-correcting arbitrary triple errors, i.e., falsely indicating a single error in such words. That problem is solved, in accordance with the present invention, by invoking the complement/recomplement procedure under certain circumstances when ECC logic indicates a correctable error, and comparing the ECC-corrected data word with the result of the complement/recomplement cycle. The sequence, which may be implemented alternatively in sequential logic or in microcode, is shown in the figure.

Referring to the figure, each time a word is fetched (block 1) from memory, the word is checked by ECC logic (block 2) well known in the art. The result of this check is a syndrome which may be zero (indicating the fetched word is correct), invalid even (indicating a double or multiple-even error), or odd. An odd syndrome may be valid (pointing to one bit in the fetched word believed to be a single correctable error) or invalid (pointing to a non-existent position in the word). Both even syndromes and invalid-odd syndromes produce no correction and cause complement/recomplement (C/RC) to be invoked (block 3). Complement/recomplement inverts all bits in the fetched word, writes the inverted word back at the same address in memory from which it was fetched, reads it back, re-inverts all bits, and tests the reinverted word with ECC logic (block 4). Discovered stuck faults (those in which the correct data is opposite to the stuck condition) are erased by this sequence, while hidden stuck faults and soft (transient) faults show up as errors in the recomplemented word. The ECC test of the recomplemented data may produce a zero syndrome (recomplemented data is correct), an odd/valid syndrome (recomplemented data contains one correctable error), or an even or odd/invalid syndrome (recomplemented data is incorrect). In this last case, the error is unrecoverable. The above description covers the upper-right portion of the figure, and cases A, C, E, F, H, J, L, M, R, S, and U as shown in the figure and listed in the Table. It is known prior art.

The left side of the figure illustrates the additional steps taken in accordance with the present invention when the fetch syndrome is valid but possibly incorrect. If the data comes from an address known or suspected of containing a multiple stuck fault, (block 5) then the valid fetch syndrome is used to correct the fetched word (block 6) and the result is saved as X. Complement/recomplement is invoked (block 7) and the recomplemented word tested by ECC (block 8). If the C/RC syndrome is zero, the recomplemented word is the correct data word. If the C/RC syndrome is even or odd/invalid, then X is the correct data word. If the C/RC syndrome is valid, the correction is applied to he recomplemented word, and the result compared to X (block 9). If the two words are equal (block 10) both X and the corrected recomplemented word are correct. If the two words are unequal, one or the other of X and the corrected recomplemented word are correct, but without additional information, one cannot tell which one is correct and the error is unrecoverable.

The Table below lists all combinations of up to three stuck (hard) faults which may be expected to occur on the assumption that double stuck faults will be left unrepaired and triple faults will be repaired. Each case is labelled and keyed to its exit point in the flow of the figure.

TABLE

| Case | Hard Faults | Discov'd Faults | Hidden Faults | Soft Faults | ECC Result Bit Ct. | ECC Result Act. | C/RC Result Bit Ct. | C/RC Result Act. | Net Result |
|---|---|---|---|---|---|---|---|---|---|
| A | 0 | 0 | 0 | 0 | 0 |      |   |      | OK |
| B | 0 | 0 | 0 | 1 | 1 | CORR | 1 | CORR | OK |
| C | 0 | 0 | 0 | 2 | 2 | UE   | 2 | UE   | UNRECOV |
| D | 1 | 1 | 0 | 0 | 1 | CORR | 0 | CORR | OK |
| E | 1 | 0 | 1 | 0 | 0 |      |   |      | OK |
| F | 1 | 1 | 0 | 1 | 2 | UE   | 1 | CORR | OK |
| G | 1 | 0 | 1 | 1 | 1 | CORR | 2 | UE   | OK |
| H | 2 | 2 | 0 | 0 | 2 | UE   | 0 | CORR | OK |
| I | 2 | 1 | 1 | 0 | 1 | CORR | 1 | CORR | OK |
| J | 2 | 0 | 2 | 0 | 0 |      |   |      | OK |
| K | 2 | 2 | 0 | 1 | 3 | MIS  | 1 | CORR | UNRECOV |
| L |   |   |   |   |   | UE   | 1 | CORR | OK |
| M | 2 | 1 | 1 | 1 | 2 | UE   | 2 | UE   | UNRECOV |
| N | 2 | 0 | 2 | 1 | 1 | CORR | 3 | MIS  | UNRECOV |
| P |   |   |   |   |   |      |   | UE   | OK |
| Q | 3 | 3 | 0 | 0 | 3 | MIS  | 0 | CORR | OK |
| R |   |   |   |   |   | UE   | 0 | CORR | OK |
| S | 3 | 2 | 1 | 0 | 2 | UE   | 1 | CORR | OK |
| T | 3 | 1 | 2 | 0 | 1 | CORR | 2 | UE   | OK |
| U | 3 | 0 | 3 | 0 | 0 |      |   |      | OK |

Ct. = Count
Act. = Action
UNRECOV = Unrecoverable

The net result is that there are no mis-corrections as a result of leaving double-stuck faults unrepaired. Indeed, if soft errors were absent, there would not be any detected but unrecoverable errors at all caused by leaving double stuck situations unrepaired.

In the Table, discovered faults are those in which the correct data is opposite to the actual stuck-fault condition. Hidden faults are those in which the correct data is the same as the stuck-fault condition. Three errors in the same data word may produce either a miscorrection (MIS) or an invalid syndrome (UE), as in cases K, L; N, P; and Q, R.

The present procedure does impose additional accesses to memory. Complement/recomplement, when invoked, uses two additional write cycles and one additional read cycle. It will be noticed from the Table that possible ECC miscorrections occur only when two (or more) hard faults are present in an ECC word. To reduce instances of "unnecessary" complement/recomplement cycles, and thus minimize the additional memory loading, it is desirable to invoke complement/recomplement only when an apparent single correctable error is detected at an address known to contain two stuck faults (in addition, of course, to invocations due to faults on fetch as represented by block 3 of the prior art portion of the figure). Such addresses are easily identified on-line as an adjunct of double error recovery using prior art complement/recomplement techniques. By counting the number of ones in the Exclusive-OR of the originally fetched word with the recomplemented re-fetched word, an accurate count of all (and only) the stuck bits is obtained. This is described in the paper (citation) "Large System Fault Tolerant Memory Techniques" by Philip M. Ryan, *Digest of Papers*, 13th Annual International Symposium on Fault Tolerant Computing, June 1983, pp 342–345. This information may be used as shown in block 12 in the lower-right portion of the figure, to mark sections of memory known to contain double stuck faults. It should be noted that in the figure, exit points B, D and G appear twice, (blocks 5; blocks 8 and 10). However, exit will take place at one or the other of the blocks 5 or blocks 8 and 10 depending on whether the single error word appears in a portion of memory which has not or has, respectively, been marked as containing a previously detected double stuck fault (as tested in block 5).

A map of memory locations containing double stuck faults can be maintained using one bit for each memory block. The overhead for this map can be kept to 0.1% or less of the main memory array space by appropriate choice of the block size. For large systems, a good choice for block size is a logical line, the unit normally accessed for transfer from main memory. It is this map of double-stuck addresses which is consulted in decision block 5 of the figure, and which is updated by output 13 of block 12 when two stuck errors are found by counting "stucks" in block 11 of the figure.

It should be noted that being able to tolerate safely double-stuck faults does not require that large numbers of words containing double faults be tolerated. A threshold on the number of double stuck words can be established beyond which a scheduled repair is recommended. This will minimize the exposure to soft errors causing unrecoverable errors by appearing in words already containing two stuck faults (cases K - P in the Table).

For further protection against errors, it should be recognized that a newly developed hard fault may align with existing hard faults in more than one memory word. With this in mind, it may be desirable, when a double stuck condition is first recognized in a word to access every memory word served by the two aligning chips, simply to identify all other words which may, with the development of the most recent stuck fault, also have become subject to double stuck conditions as yet unrecorded in the double stuck map. This procedure would provide extra protection against the mis-correction of a soft error with an unrecorded double stuck fault (case K in the Table).

The additional hardware required for implementation of the present invention comprises a register (to hold X) and a comparator fed by X and the recomplemented corrected output of the complement/recomplement apparatus. In larger systems, at least, such registers and comparators already exist in the diagnostic facilities of the memory controller. In smaller systems, design trade-offs may dictate saving hardware by doing more via software.

In some cases, it may be desirable to implement the map of known double errors not with a one-bit-per-logical-line array as described above, but in a relatively small, relatively slow associative store. For large systems which access multiple ECC words in groups called logical lines, the associative store would have as many bits in the search field as there are bits in a line address. (e.g., a 32 MB BSM contains 256K logical lines of 128 bytes each, so the line address is 18 bits wide). The output field in this case could consist of a "hit" line (to indicate this logical line contains at least one ECC word known to have double faults), plus zero, or 4, or 16 bits indicating which word(s) in the line are known to have double faults. With zero output bits, the logic is the same as described above (i.e., if a single error is encountered, perform complement/recomplement. With 4 output bits, the bits encode the word-within-logical-line position of the one word having double faults in this line, and the 4 bits go into a 4 bit comparison circuit with the double-word identification (DWID) specifying which word is to be transferred. A "match" signals that if an apparent single error is encountered in the transferred word, a complement/recomplement cycle is to be initiated following the flow chart of the figure, in this case only one double faulted word per logical line can be tolerated, and the occurrence of more than one must cause deallocation. With 16 output bits, one bit is associated with each ECC word in the logical line to indicate that a double fault has been detected previously in that word, and any number of double faulted words per line can be tolerated.

The "hit" line mentioned above may (or may not) be used to initiate a complement-write cycle of memory in anticipation of the need for complement/recomplement. If every word of the logical line is transferred, as is usual, then about three-fourths of the accesses to double faulted lines will require complement/recomplement. It is probably advantageous to initiate the complement-write cycle immediately rather than waiting for ECC to discover either a single or a double error.

It should be noted that the associative store need not be very extensive since large-extent alignments will normally be eliminated, eventually, by applying deallocation, spare deployment or other remedy in some combination. The associative store need not be any faster than the main store arrays, since it is not in series with the memory access path.

While the invention has been particularly shown and described with reference to the preferred embodiment thereof, it will be understood by those skilled in the art that various changes in form and detail may be made therein without departing from the spirit and scope of the invention.

What is claimed is:

1. Means for producing a suspected triple bit error alerting signal, said signal producing means extending the error detection capability of a single bit error detection and correction/double bit error detection code means used in a memory system wherein multiple bit word signals are fetched from memory from respective memory addresses and applied to said code means, said signal producing means including
   means for storing first signals representing the addresses of blocks of fetched word signals wherein a double bit error is detected by said code means,
   address comparison means receiving said stored first signals,
   means for applying to said address comparison means second signals representing the address of each fetched word wherein a single bit error is detected by said code means,
   said address comparison means producing said suspected triple bit error alerting signal upon coincidence of the addresses of said double bit error words and said single bit error word represented by said first and second signals respectively.

2. The apparatus defined in claim 1 and further comprising error recovery means responsive to said alerting signal, respective valid fetch syndrome signal and fetched word signal having a detected single bit error, said correction means correcting each said fetched word signal using said respective syndrome signal to produce a first corrected word signal, when said alerting signal is produced by said address comparison means,
- word storage means receiving each said first corrected word signal,
- complement/recomplement (C/RC) means receiving said single bit error word signal corresponding to said first corrected word signal and producing a recomplemented corrected word signal, and
- ECC logic means receiving each said recomplemented word signal and producing a respective C/RC syndrom signal.

3. The apparatus defined in claim 2 and further including means for evaluating said C/RC syndrome signal and producing a first output signal if said C/RC syndrome signal is zero.

4. The apparatus defined in claim 3 wherein said means for evaluating said C/RC syndrome signal produces a second output signal if said C/RC syndrome signal is even or odd/invalid.

5. The apparatus defined in claim 4 wherein said means for evaluating said C/RC syndrome signal produces a third output signal if said C/RC syndrome signal is valid.

6. The apparatus defined in claim 5 and further inclduing additional ECC logic means responsive to said third output signal, said recomplemented word signal and said C/RC syndrome signal said additional ECC logic means correcting said recomplemented word signal using said C/RC syndrome signal to produce a second corrected word signal, when said third output signal is produced, and
- comparison means receiving said second corrected word signal and said first corrected word signal and producing a fourth output signal upon equality of the compared signals.

7. The apparatus defined in claim 2 and further including exclusive ORing means receiving said single bit error word signal and said recomplemented word signal and producing a fifth output signal representing the number, if any, of stuck faults in said single bit error word signal.

8. The apparatus defined in claim 7 and further including means for counting the number of stuck fault representations in said fifth output signal and producing a sixth output signal when said number equals two, and
- means applying said sixth output signal to said means for storing the addresses of blocks of fetched word signals wherein a double bit error is detected.

* * * * *